Figure 1:
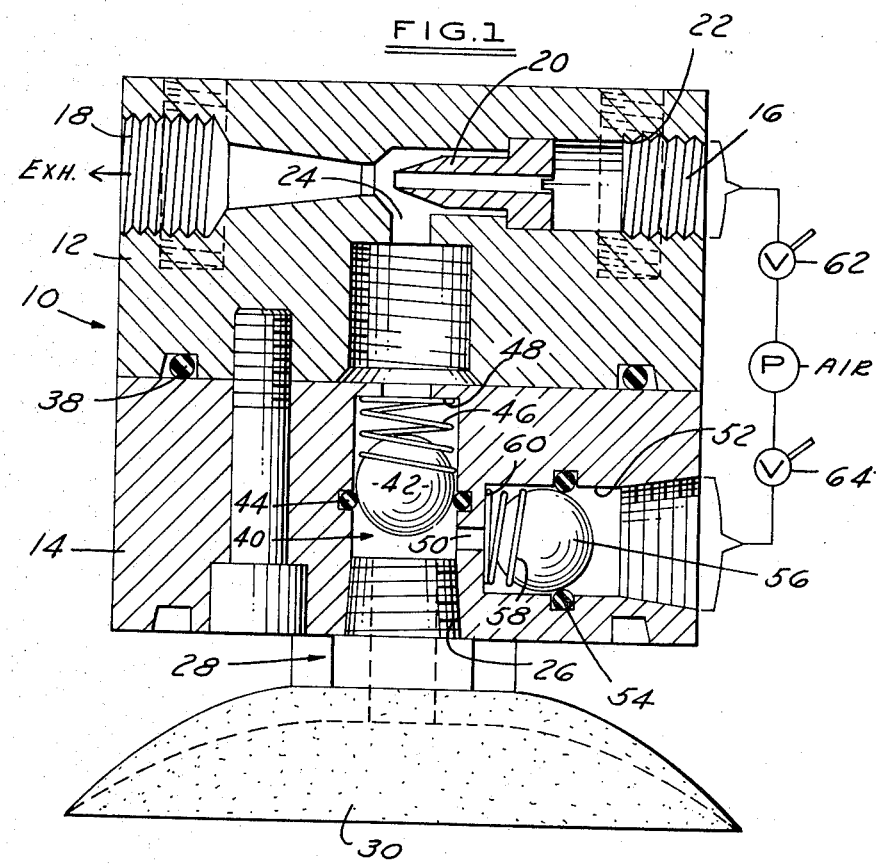

United States Patent [19]

Hansen

[11] 3,716,307
[45] Feb. 13, 1973

[54] VENTURI HEAD FOR VACUUM SYSTEMS
[75] Inventor: Richard R. Hansen, Roseville, Mich.
[73] Assignee: KMS Industries, Inc., Ann Arbor, Mich.
[22] Filed: Oct. 6, 1971
[21] Appl. No.: 186,861

[52] U.S. Cl............417/191, 248/362, 294/64 A, 294/64 B
[51] Int. Cl........A47b 97/00, B66c 1/04, A45d 42/14
[58] Field of Search...248/363, 362, 206 R; 417/191; 294/64 R, 64 A, 64 B, 65; 141/65, 66

[56] References Cited

UNITED STATES PATENTS

| 3,181,563 | 5/1965 | Giffen | 294/64 R |
| 3,219,380 | 11/1965 | Carliss | 294/64 R |
| 3,423,119 | 1/1969 | Stanley | 294/65 |

*Primary Examiner*—Carlton R. Croyle
*Assistant Examiner*—Richard E. Gluck
*Attorney*—Arthur Raisch et al.

[57] ABSTRACT

A venturi-head for a vacuum system utilized as a source of negative pressure for vacuum cups and the like which has incorporated therein a safety shut off valve to hold vacuum in the vent of a failure of actuating jet stream and requiring a pressure release available only when pressure source is furnishing required pressure.

4 Claims, 2 Drawing Figures

VENTURI HEAD FOR VACUUM SYSTEMS

This invention relates to a venturi head for vacuum systems and more particularly to a head and system which provides a fail-safe condition in the event of air pressure loss or failure.

Venturi-type vacuum systems have been in use for a number of years for imparting a reduced pressure to vacuum cups used in lifting glass and metal plates or other industrial parts having a relatively flat nonporous surface. One of the problems that has existed with these systems is that, while a proper vacuum could be achieved with all systems at normal air pressure, any abnormal reduction in source pressure or failure of the source pressure would result in a vacuum loss at the vacuum outlet, thereby resulting in a vacuum loss and failure or the system.

It is an object of the present invention to provide a venturi head which can be safely operated at normal air pressures but which will automatically lockin to become independent of the source line pressure once sufficient vacuum is achieved. Accordingly, should there be an abnormal reduction in source line pressure or a failure of source line pressure, the activated vacuum cups will not release the part.

Thus, it is an object of the invention to provide a fail-safe vacuum head which can function at normal air line pressures, but is independent of air line pressure while in a holding condition.

Briefly, the invention is accomplished by providing a venturi head with a working passage having a unidirectional valve biased to close when pressures are balanced on either side of it, and in which release comes from an independent passage pressure operated from the basic pressure source or by other mechanical means.

Other objects of the invention will be apparent in the following description and claims taken with the accompanying drawings in which there is disclosed the principles of operation of the invention and the best mode presently contemplated for the practice thereof.

DRAWINGS accompany the disclosure and the various views thereof may be briefly described as:

FIG. 1, a sectional view of a venturi-head and safety control system.

Figure 2:
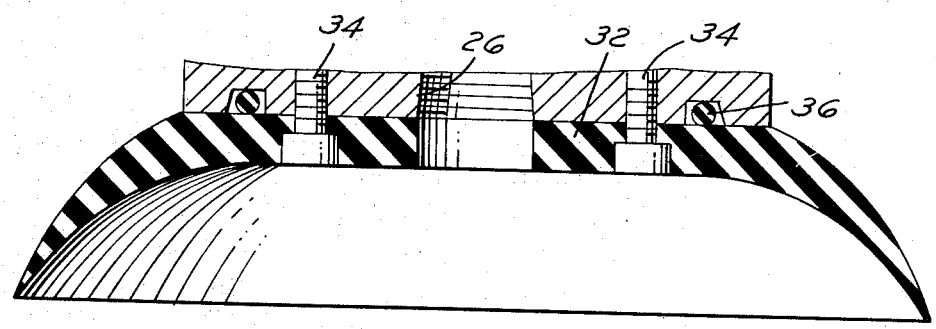

FIG. 2, a view of an optional vacuum cup assembly.

Referring to the drawings, in FIG. 1 a body 10 is composed of two portions 12 and 14. If desired, the parts can be formed as a single block. Body portion 12 is a venturi section having a venturi cross passage originating at an inlet 16 and terminating at an exhaust port 18 with a venturi restriction nozzle 20 interposed centrally therebetween in a passage 22. A source of pressure P can deliver air under pressure to inlet 16 at any desired pressure.

A working passage 24 extends transversely of the venturi passage to a vacuum cup outlet 26 into which is threaded a nipple tube 28 supporting a vacuum cup 30. If desired, a cup base shaped as shown in FIG. 2 can be used wherein the apertured base 32 of the cup having a suitable reinforcement is bolted to the outer surface of the body 10 at the vacuum cup outlet 26 by bolts 34. A sealing means 36 serves to seal the adjoining faces. A sealing means 38 also seals the two portions 12 and 14 of body 10 together, but, as pointed out above, these can be unified in an integral one-piece body.

The working passage 24 of the body portions has a section 40 enlarged to receive a ball check 42 which acts on a ball seat 44 to provide unidirectional flow away from the vacuum cup outlet 26. A spring 46, seated against a shoulder 48, acts on this ball check.

A release passage is also provided at 50 intersecting the vacuum cup outlet passage between the cup mount and the ball check 42. This passage 50 enlarges at 52 to provide a valve chamber having a seat at a sealing means 54 and to contain a ball check valve 56 backed by a spring 58 seated against a shoulder 60.

The pressure source P has pressure leads to inlet 16 and chamber 52 controlled respectively by valves 62 and 64 shown diagrammatically.

Actuations of valve 62, with valve 64 closed, will direct air to the venturi nozzle which exhausts at outlet 18.

When the vacuum cup 30 is sealed off by application against a surface, the air will be exhausted from passage 24 to the point that atmospheric pressure in the cup chamber will open ball check valve 42 against spring 46 and allow a low-pressure condition above and below the ball check valve 42.

When the spring pressure is overcome and the ball 42 lifts off the seat 44, the pressure will equalize on either side of the ball and the spring will return the ball to the valve seat. Valve 62 may now be closed and the system is now in a fail-safe condition. In this state, the vacuum force will exist for a considerable period of time while holding a part.

During this holding cycle, the spring 58 is holding the ball 56 against the seat 54 resisting atmospheric pressure which tends to open the valve. Thus, spring 58 must have a valve greater than the forces tending to lift it off of its seat.

When the holding cycle is to be interrupted, valve 64 is opened to direct pressure to chamber 52 which will open valve check 56 and pressurize the vacuum passage 26 and the cup chamber, thus effecting release of the cup from a closing surface. This release sequence can also be achieved by mechanical or manual actuation of valve 56.

Thus, it will be seen that should there be a pressure failure during a holding cycle, there will be no accidental release of vacuum. The release cannot be effected until the pressure is restored and exerted in chamber 52.

I claim:

1. A fail safe vacuum head for lifting or holding which comprises:
    a. a body having formed therein a venturi passage with an inlet, an exhaust, and a low pressure working passageway leading to a vacuum passage, said venturi being activated by introduction of air pressure into said inlet,
    b. a check valve in said working passage between said vacuum outlet and said venturi,
    c. a valve seat in said working passage to function in conjunction with said check valve,
    d. resilient means biasing said check valve toward said seat to close said working passage in the direction of said vacuum passage, wherein said check valve opens against said bias when pressure in said vacuum passage overcomes said resilient means and closes when pressures are equalized on both sides of said valve in said working passageway to prevent pressurizing of said vacuum passage, e. a release passage in said body leading to said working passage between said valve seat and said vacuum passage, f. a second valve seat in said release passage, g. a second check valve in said release passage positioned to close said second seat in the direction away from said vacuum passage, and h. means resiliently to bias said second check valve against said second seat with a force greater than the force generated by atmospheric pressure during any vacuum sequence at said vacuum outlet.

2. A device as defined in claim 1 in which means is provided to move said second check valve against said bias to admit pressure to said vacuum passage.

3. A device as defined in claim 1 in which an additional passage means is provided to connect said release passage to a source of pressure, and valve means in said additional passage to connect said release passage to a pressure source to move said second check valve to an open position against the resilient bias to pressurize the working passage.

4. A safety-release vacuum system for a lift cup which comprises:

a. a body having formed therein a venturi passage with an inlet, an exhaust, and a low pressure working passageway leading to a vacuum passage, said venturi being activated by introduction of air pressure into said inlet, b. a unidirectional valve in said working passage resiliently biased toward said vacuum passage adapted to close when pressure is balanced on both sides of said valve, c. a pressure release passage connected to said working passage between said valve and said vacuum passage, d. a second unidirectional valve in said pressure release passage biased away from said working passage by a resilient means to a degree to withstand atmospheric pressure, and e. means to introduce air above atmospheric pressure to said pressure release passage to move said second unidirectional valve and pressurize said working passage.

* * * * *